United States Patent
Paul et al.

(10) Patent No.: US 10,794,780 B2
(45) Date of Patent: Oct. 6, 2020

(54) MAGNETIC SUPPORT STRUCTURE OF A TORQUE SENSOR ASSEMBLY INCLUDING A CENTRAL HUB AND A PLURALITY OF SPOKE SEGMENTS EXTENDING RADIALLY OUTWARDLY FROM THE CENTRAL HUB

(71) Applicant: STEERING SOLUTIONS IP HOLDING CORPORATION, Saginaw, MI (US)

(72) Inventors: Subhra Paul, Saginaw, MI (US); Mohammed R. Islam, Saginaw, MI (US); Jared K. Moore, Saginaw, MI (US)

(*) Notice: Subject to any disclaimer, the term of this patent is extended or adjusted under 35 U.S.C. 154(b) by 219 days.

(21) Appl. No.: 15/287,360

(22) Filed: Oct. 6, 2016

(65) Prior Publication Data

US 2017/0102280 A1    Apr. 13, 2017

Related U.S. Application Data

(60) Provisional application No. 62/238,796, filed on Oct. 8, 2015.

(51) Int. Cl.
   *G01L 3/10* (2006.01)
   *F16M 13/02* (2006.01)

(52) U.S. Cl.
   CPC .............. *G01L 3/104* (2013.01); *F16M 13/02* (2013.01)

(58) Field of Classification Search
   CPC ........ G01L 3/104; H02K 1/28; H02K 1/2726; H02K 1/2746; H02K 1/274; H02K 1/276; H02K 1/2786; H02K 1/30; H02K 1/2706; H02K 1/2793; H02K 1/226; G01D 5/2457; F16M 13/02
   See application file for complete search history.

(56) References Cited

U.S. PATENT DOCUMENTS

| | | | | |
|---|---|---|---|---|
| 4,445,062 | A * | 4/1984 | Glaser .................. | H02K 1/2773 310/156.59 |
| 4,700,096 | A * | 10/1987 | Epars ................... | H02K 1/2773 310/153 |
| 5,010,266 | A * | 4/1991 | Uchida ................ | H02K 1/2773 310/156.22 |

(Continued)

FOREIGN PATENT DOCUMENTS

| CN | 101002078 A | 7/2007 |
|---|---|---|
| CN | 101523176 A | 9/2009 |

(Continued)

OTHER PUBLICATIONS

English Translation of Office Action regarding related CN App. No. 201611113747.3; dated Sep. 29, 2018; 10 pgs.

(Continued)

*Primary Examiner* — Tran M. Tran
(74) *Attorney, Agent, or Firm* — Dickinson Wright PLLC

(57) ABSTRACT

A magnetic support structure of a torque sensor assembly includes a central hub surrounding an upper shaft. Also included is a plurality of spoke segments extending radially outwardly from the central hub, each of the spoke segments comprising a pair of magnet supports. Further included is a plurality of magnets, each of the magnets disposed between adjacent magnet supports of the spoke segments.

17 Claims, 7 Drawing Sheets

(56) References Cited

U.S. PATENT DOCUMENTS

| | | | | |
|---|---|---|---|---|
| 5,829,120 A * | 11/1998 | Uchida | | H02K 1/2773 29/598 |
| 5,969,269 A * | 10/1999 | Munyon | | G01L 3/12 73/862.328 |
| 6,472,789 B1 * | 10/2002 | Akemakou | | H02K 21/042 310/156.49 |
| 6,651,309 B2 * | 11/2003 | Gay | | H02K 1/02 29/596 |
| 6,768,238 B2 * | 7/2004 | Knauff | | H02K 1/2773 310/156.53 |
| 6,889,419 B2 * | 5/2005 | Reiter, Jr. | | B22F 7/064 29/596 |
| 7,146,708 B2 * | 12/2006 | Reiter, Jr. | | B22F 7/064 29/598 |
| 7,639,004 B2 * | 12/2009 | Islam | | G01L 3/104 324/207.2 |
| 7,644,635 B2 | 1/2010 | Prudham et al. | | |
| 7,784,365 B2 * | 8/2010 | Masson | | G01L 3/104 73/862.331 |
| 7,960,884 B2 * | 6/2011 | Miyata | | H02K 1/2793 310/114 |
| 8,607,649 B2 * | 12/2013 | Matsumoto | | G01L 3/104 73/862.333 |
| 8,829,758 B2 * | 9/2014 | Takizawa | | H02K 1/2773 310/156.48 |
| 8,860,271 B2 * | 10/2014 | Iwakiri | | H02K 1/2773 310/156.08 |
| 8,890,514 B2 * | 11/2014 | Masson | | B62D 6/10 324/207.21 |
| 8,960,020 B2 | 2/2015 | Islam | | |
| 9,077,236 B2 * | 7/2015 | Mantovani | | H02K 21/12 |
| 9,099,905 B2 * | 8/2015 | Manz | | H02K 1/2773 |
| 9,347,843 B2 * | 5/2016 | Franz | | G01L 3/102 |
| 9,698,636 B2 * | 7/2017 | Matsuoka | | H02K 1/2773 |
| 9,823,146 B2 * | 11/2017 | Paul | | G01L 3/101 |
| 9,954,410 B2 * | 4/2018 | Furutachi | | H02K 1/2773 |
| 10,069,357 B2 | 9/2018 | Ekin et al. | | |
| 10,411,532 B2 * | 9/2019 | Lee | | H02P 5/22 |
| 2006/0236784 A1 * | 10/2006 | Feng | | G01L 3/104 73/862.332 |
| 2007/0114861 A1 * | 5/2007 | Bott | | B65G 13/075 310/71 |
| 2008/0092671 A1 * | 4/2008 | Maehara | | B62D 6/10 73/862.331 |
| 2008/0314164 A1 * | 12/2008 | Masson | | G01L 3/104 73/862.333 |
| 2010/0084215 A1 * | 4/2010 | Sakatani | | B62D 6/10 180/444 |
| 2013/0249538 A1 | 9/2013 | Oike et al. | | |
| 2015/0318746 A1 * | 11/2015 | Miyajima | | H02K 1/2773 310/71 |
| 2016/0079818 A1 * | 3/2016 | Furutachi | | H02K 1/2773 310/43 |
| 2017/0158467 A1 * | 6/2017 | Lin | | B66B 11/0438 |

FOREIGN PATENT DOCUMENTS

| | | |
|---|---|---|
| CN | 103196607 A | 7/2013 |
| CN | 104871403 A | 8/2015 |
| JP | 2015081880 A | 4/2015 |
| KR | 20150017733 A | 2/2015 |

OTHER PUBLICATIONS

Office Action regarding related CN App. No. 201611113747.3, dated Dec. 2, 2019, 5 pgs.

* cited by examiner

MAGNETIC SUPPORT STRUCTURE OF A TORQUE SENSOR ASSEMBLY INCLUDING A CENTRAL HUB AND A PLURALITY OF SPOKE SEGMENTS EXTENDING RADIALLY OUTWARDLY FROM THE CENTRAL HUB

CROSS-REFERENCE TO RELATED APPLICATION

This patent application claims priority to U.S. Provisional patent Application Ser. No. 62/238,796, filed Oct. 8, 2015, which is incorporated herein by reference in its entirety.

BACKGROUND OF THE INVENTION

The invention relates to torque sensor assemblies and, more particularly, to a magnetic support structure of such assemblies.

Non-contacting torque sensors generate output voltage corresponding to the relative angular displacement between an upper and lower shaft connected by a torsion bar. From the output voltage, a control system measures a steering assist value provided to the vehicle. It is desirable for a torque sensor to produce a linear response of high gain (Gauss/degree) with respect to the differential angle between the upper and lower shaft. Also, an ideal sensor output should be noise free.

A typical torque sensor consists of a permanent magnet structure attached to either of the two shafts connected by the torsion bar, two ferromagnetic rings connected to the other shaft and at least one hall element in between the ferromagnetic rings. Only a relative angular displacement of the magnet (or the shaft attached to the magnet) with respect to the ferromagnetic rings (or the shaft attached to the rings) will change the flux density in between the rings which is measured by the hall element. The permanent magnet structure can be magnetized in the axial or the radial direction. In the case of axial magnetization, typically the ferromagnetic rings are concentric, coaxial and radially separated from each other. Hence, the hall element senses the radial flux density that varies highly along the gap between the rings and is therefore sensitive to the location of the hall probe.

In the case of radial magnetization of the magnets, the ferromagnetic rings are axially separated from each other. Hence, the hall element measures the axial flux density and is less sensitive to the axial gap between the rings. Torque sensors have typically used rare-earth magnets to provide high gain. This may lead to cost fluctuation depending on the cost of the rare-earth material. On the other hand, a ferrite magnet based sensor can have stable and lower cost. However, the main challenges with a ferrite design are achieving high gain and robustness towards demagnetization.

SUMMARY OF THE INVENTION

In one aspect of the invention, a magnetic support structure of a torque sensor assembly includes a central hub. Also included is a plurality of spoke segments extending radially outwardly from the central hub, each of the spoke segments comprising a pair of magnet supports defining a space therebetween at a radially outer portion of the spoke segment, wherein adjacent magnetic supports retain a magnet therebetween.

In another aspect of the invention, a torque sensor assembly includes an upper rotor. The upper rotor includes a magnetic support structure including a central hub surrounding an upper shaft. The upper rotor also includes a plurality of spoke segments extending radially outwardly from the central hub, each of the spoke segments comprising a pair of magnet supports. The upper rotor further includes a plurality of magnets, each of the magnets disposed between adjacent magnet supports of the spoke segments. The torque sensor assembly also includes an outer lower rotor operatively coupled to a lower shaft and axially spaced from the upper rotor. The torque sensor assembly further includes an inner lower rotor operatively coupled to the lower shaft and located axially between the upper rotor and the outer lower rotor. The torque sensor assembly yet further includes at least one probe positioned between the outer lower rotor and the inner lower rotor, the at least one probe measures axial flux generated by the upper rotor and directed by the outer lower rotor and the inner lower rotor.

In yet another aspect of the invention, a magnetic support structure of a torque sensor assembly includes a central hub. Also included is a plurality of spoke segments extending radially outwardly from the central hub, each of the spoke segments comprising a pair of magnet support edges having a solid portion disposed therebetween along an entire radial length of the pair of magnet support edges, wherein adjacent magnetic supports retain a magnet therebetween.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
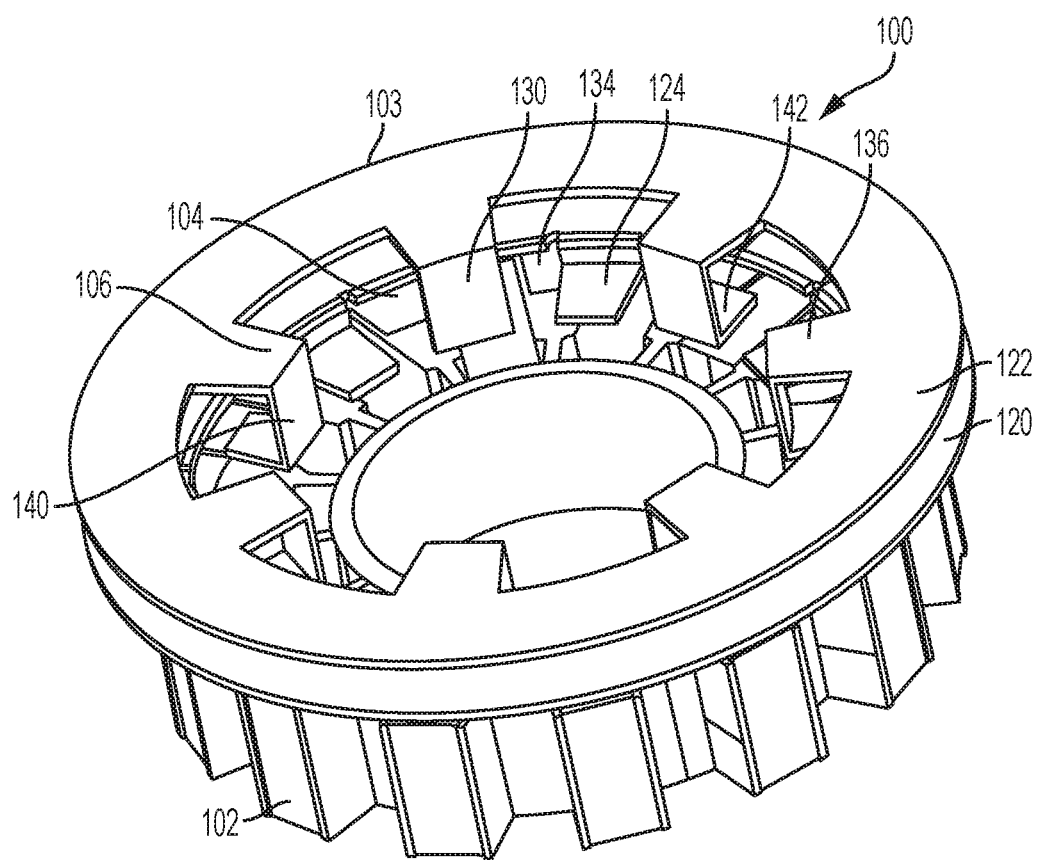
FIG. 1 is a perspective view of a torque sensor.

Referring now to FIG. 1, a small diameter torque sensor 100 in accordance with one embodiment of the invention is illustrated. As shown in FIG. 1, the small diameter torque sensor 100 comprises an upper rotor 102 and a lower rotor 103. The lower rotor 103 is comprised of an inner lower rotor 104 and an outer lower rotor 106. The upper rotor 102, the inner lower rotor 104 and the outer lower rotor 106 are axially disposed about a rotational axis. As described in more detail below, axial flux is generated by the upper rotor 102 and directed at least in part by the inner lower rotor 104 and the outer lower rotor 106. The relative angular displacement of the upper rotor 102 and lower rotor 103 cause measurable changes in axial flux density.

The inner lower rotor 104 is arranged between the outer lower rotor 106 and the upper rotor 102 along a rotational axis. An axial gap 109 (FIGS. 2 and 6) is formed between the inner lower rotor 104 and the outer lower rotor 106. The inner lower rotor 104 comprises an inner ringed frame 120 and the outer lower rotor 106 comprises an outer ringed frame 122. A plurality of teeth 124 is circumferentially disposed around the inner lower rotor 104, defining a plurality of gaps between the plurality of teeth 124. The plurality of teeth 124 extend radially inward from the inner ringed frame 120.

In this embodiment, at least one tooth of the plurality of teeth 124 attaches to the inner ringed frame 120, extending radially inward. In another embodiment, tooth comprises an arced surface that extends axially toward the upper rotor 102, and a straight surface that extends radially inward from the arced surface. The arced surface of the tooth provides an offset from the inner ringed frame 120 in an axial direction, toward the upper rotor 102.

A plurality of u-shaped teeth 130 circumferentially disposed about the outer lower rotor 106 extends from the outer ringed frame 122. At least one u-shaped tooth of the plurality of u-shaped teeth 130 is circumferentially disposed within at least one gap 134 of the plurality of gaps defined by the plurality of teeth 124 of the inner lower rotor 104.

The at least one u-shaped tooth of the plurality of u-shaped teeth 130 comprises an outer tooth surface 136 that extends radially inward from the outer ringed frame 122 of the outer lower rotor 106. U-shaped tooth further comprises a channeled surface 140 that extends axially from the outer tooth surface 136 toward the inner lower rotor 104. An inner tooth surface 142 of u-shaped tooth extends radially outward. The channeled surface 140 extends to axially align the inner tooth surface 142 of u-shaped tooth with the straight surface of tooth of the inner lower rotor 104.

Figure 2:
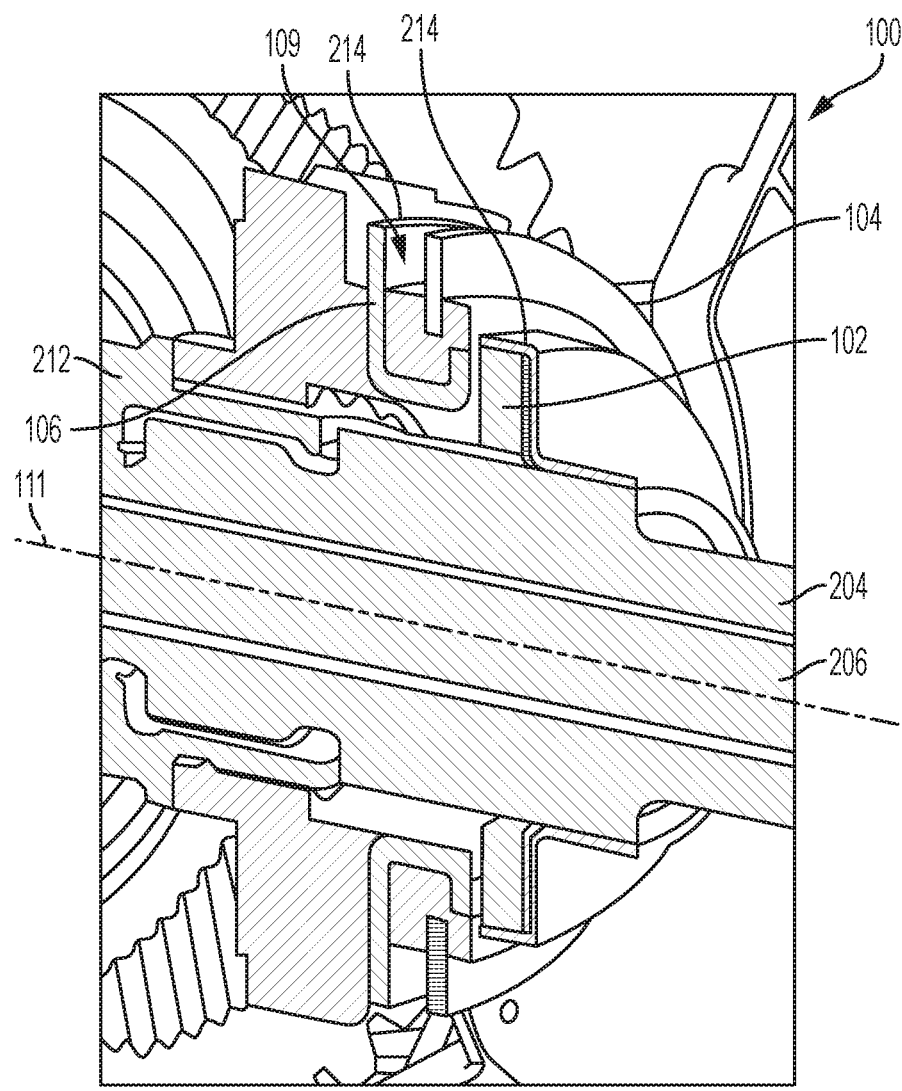
FIG. 2 is a cross-sectional view of the torque sensor.

Referring now to FIG. 2, a cross-sectional view of the torque sensor 100 is illustrated. The upper rotor 102 is attached to an upper shaft 204 of an axle, which is a torsion bar 206. The inner lower rotor 104 and an outer lower rotor 106 that are attached to a lower shaft 212 of the axle 206. The upper rotor 102, the inner lower rotor 104 and the outer lower rotor 106 are disposed about a rotational axis 111. The upper shaft 204 and the lower shaft 212 are rotatably attached with the torsion bar 206, and rotate about the rotational axis 111.

The inner lower rotor 104 and the outer lower rotor 106 are attached to the lower shaft 212 by a holding structure 214. In this embodiment, the holding structure 214 is a two-piece design. However, the holding structure 214 can be a single piece design with a single holding structure. The holding structure 214 holds the inner lower rotor 104 and the outer lower rotor 106 to separate the inner lower rotor 104 and the outer lower rotor 106 in an axial direction. A sensing probe 101 can be placed between the inner lower rotor 104 and the outer lower rotor 106.

In operation, the movement of the upper shaft 204 relative to the lower shaft 212 generates movement of the upper rotor 102 relative to the inner lower rotor 104 and the outer lower rotor 106. Flux travels axially from the upper rotor 102 to the inner lower rotor 104 and the outer lower rotor 106, where the flux is directed at least in part by the inner lower rotor 104 and the outer lower rotor 106.

The magnetic arrangement of the upper rotor 102 along with the structure of the inner lower rotor 104 and the outer lower rotor 106 causes the flux to travel back to the upper rotor 102 in an axial direction. A probe 101 of the small diameter torque sensor 100 is positioned between the inner lower rotor 104 and the outer lower rotor 106 to measure changes in flux density generated by the relative angular displacement of the upper rotor 102 relative to the inner lower rotor 104 and the outer lower rotor 106. Torque can be determined based on the measured flux density.

Figure 3:
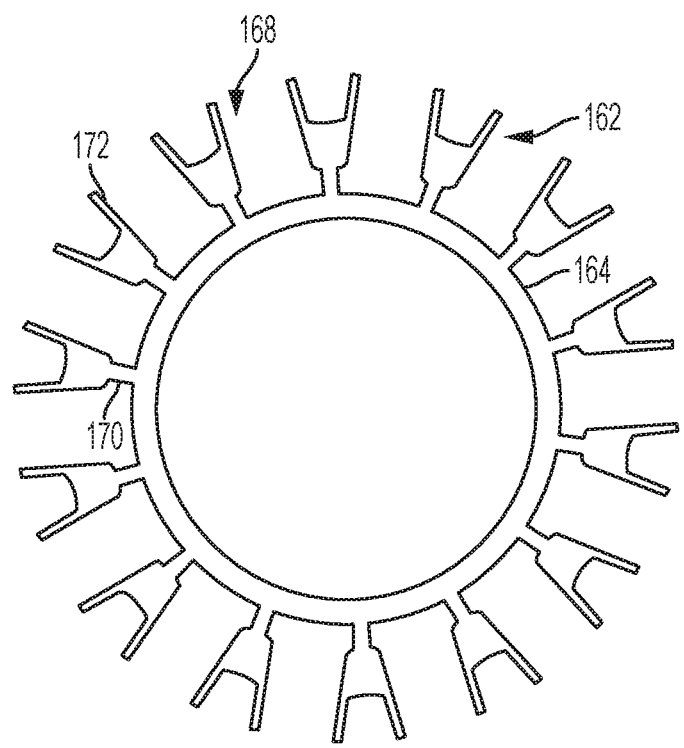
FIG. 3 is an elevational view of a magnetic support structure of the torque sensor.
Figure 4:
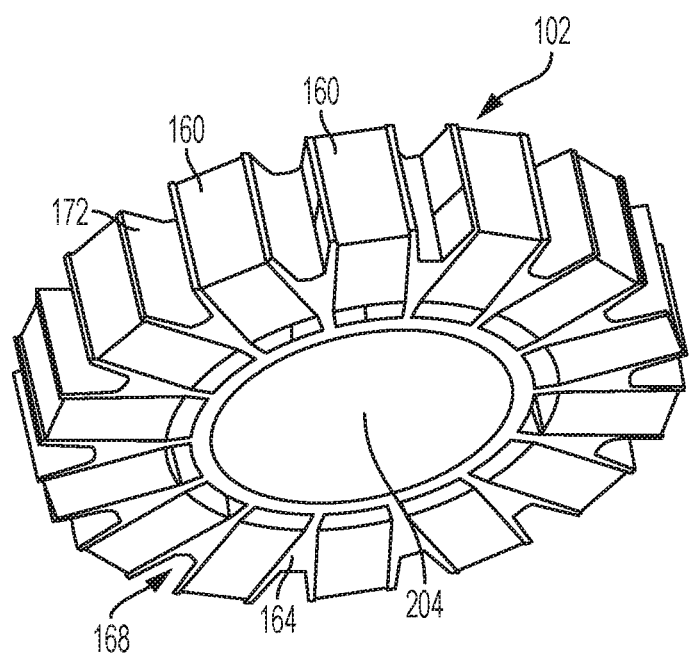
FIG. 4 is a perspective view of a magnetic structure with the magnetic support structure of FIG. 3.

Referring now to FIGS. 3 and 4, the upper rotor 102 is illustrated in greater detail. The upper rotor 102 is a permanent magnet structure that includes a plurality of magnets 160. The plurality of magnets 160 is formed by multiple pole pairs, with the number of pairs varying depending upon the particular application. In the illustrated embodiment of FIG. 3, seven pole pairs are included.

The upper rotor 102 includes a magnetic support structure 162. In one embodiment, the magnetic support structure 162 is a single, integrally formed structure. It is also contemplated that the magnetic support structure 162 is segmented. The magnetic support structure 162 is formed of a ferromagnetic material. Examples of suitable ferromagnetic materials include carbon steel and silicon steel. These materials are merely illustrative and are not limiting. The magnetic support structure 162 comprises a central hub 164 extending circumferentially around the shaft that it is operatively coupled to. Extending radially from the central hub 164 is a plurality of spoke segments 168. The spoke segments 168 are circumferentially spaced from each other about the central hub 164. Each spoke segment 168 includes a bridge member 170 extending radially from the central hub 164 and a magnet support 172 extending from the spoke segment 168. As shown in FIG. 4, adjacent magnet supports 172 are sized to receive one of the plurality of magnets 160 therein.

Figure 6:
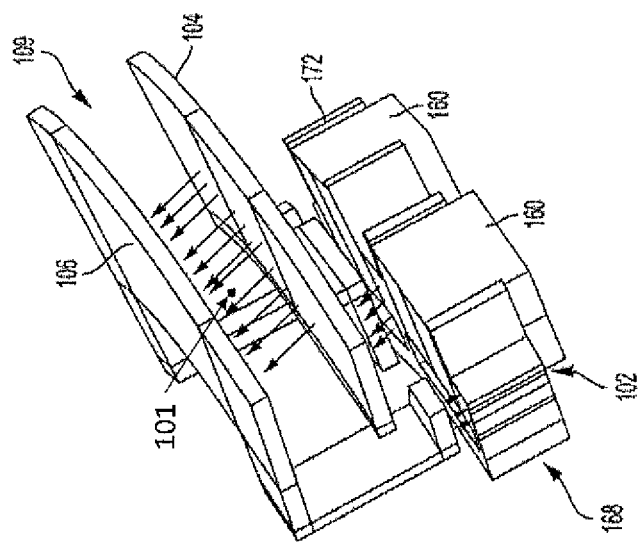
FIG. 6 is a perspective view of the enlarged portion of FIG. 5.
Figure 5:
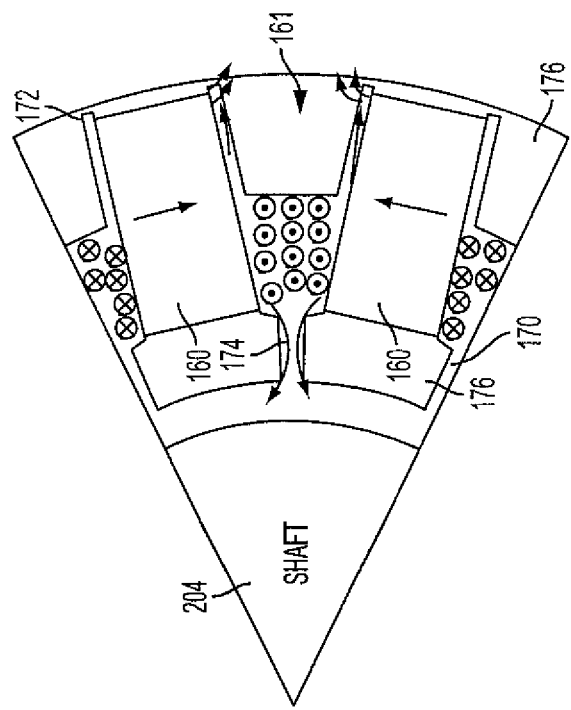
FIG. 5 is an enlarged view of a portion of the magnetic structure.

Referring now to FIGS. 5 and 6, a portion of the permanent magnet structure illustrates a pair of adjacent magnets and associated flux provided by the overall torque sensor. The dots shown in FIG. 5 indicate flux coming out of the page and crosses indicate flux into the page. As shown, the magnets are magnetized in the circumferential direction and toward each other by orienting like poles facing each other inside the ferromagnetic support structure 162 and, more particularly, between the magnet supports 172. Magnetization in this manner concentrates the flux in the ferromagnetic material of the magnetic support structure 162 in between the magnet poles and can make airgap flux density higher than the magnet flux density, thereby allowing weak magnets to be used. However, flux leakage 174 through the bridge member 170 of the magnetic support structure 162 occurs. To reduce the leakage 174, non-magnetic segments 176 are operatively coupled to the magnetic support structure 162.

As shown, a space 161 between the magnet supports 172 at a radially outer portion of the spoke segments 168 is provided to reduce an outer diameter of the inner lower rotor 104, as inner tooth surface 142 of the u-shaped tooth 130 must extend radially outward to a location where the space between magnets begins.

Figure 8:
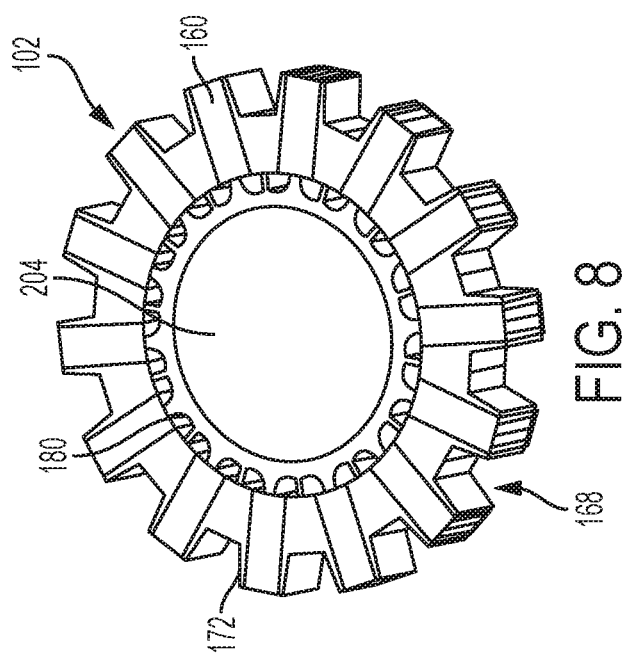
FIG. 8 is a perspective view of an upper rotor of the torque sensor of FIG. 7.
Figure 9:
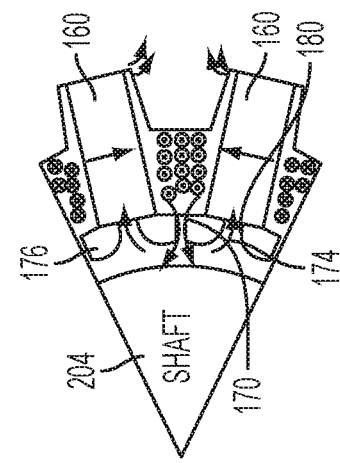
FIG. 9 is an enlarged view of a portion of the magnetic structure of FIG. 7.
Figure 7:
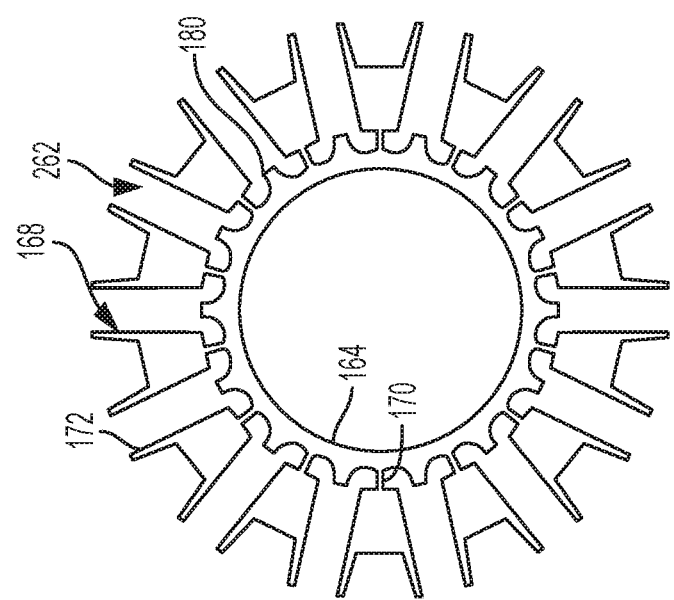
FIG. 7 is an elevational view of the magnetic support structure of the torque sensor according to another aspect of the invention.
Figure 10:
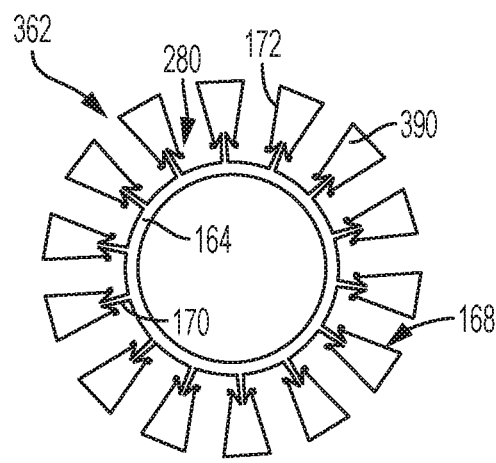
FIG. 10 is an elevational view of the magnetic support structure of the torque sensor according to yet another aspect of the invention.
Figure 11:
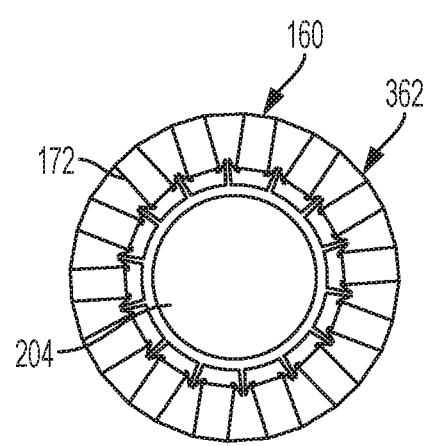
FIG. 11 is an elevational view of a magnetic structure with the magnetic support structure of FIG. 10.
Figure 12:
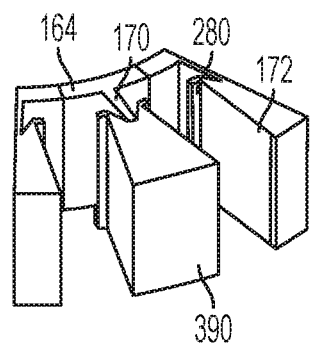
FIG. 12 is a portion of the magnetic support structure of FIG. 10.
Figure 13:
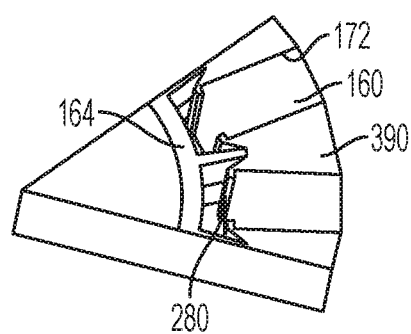
FIG. 13 is a portion of the magnetic structure of FIG. 11.

Referring now to FIGS. 7-9, another embodiment of the magnetic support structure 262 is illustrated. The magnetic support structure 262 is similar to the embodiment described above such that similar reference numerals for similar components will be employed for ease of reference. The magnetic support structure 262 includes a plurality of magnet support bridges 180 which each correspond to a respective magnet 160. Each magnet support bridge 180 extends radially outwardly from the central hub 164 and is located circumferentially between the bridge members 170. The magnet support bridges 180 assist with accurate and easy placement of the magnets 160 in the cavities of the ferrous structure, as the magnet is pushed into place until it contacts and is supported by the magnet support bridges 180.

Referring to FIGS. 10-13, another embodiment of the magnetic support structure 362 is illustrated. The magnetic support structure 362 is similar to the embodiments described above such that similar reference numerals for similar components will be employed for ease of reference. The magnetic support structure 362 includes a plurality of ledges 280 that provide magnet support. The ledges 280 extend substantially circumferentially toward each other from adjacent magnet supports 172. The ledges 280 assist with accurate and easy placement of the magnets 160 in the cavities of the ferrous structure, as the magnet is pushed into place until it contacts and is supported by the ledges 280. Additionally, the magnetic support structure 362 includes a solid wall 390 between the magnets to eliminate a space. This increases the flux that is captured from the entire metal region disposed between the magnets.

Figure 14:
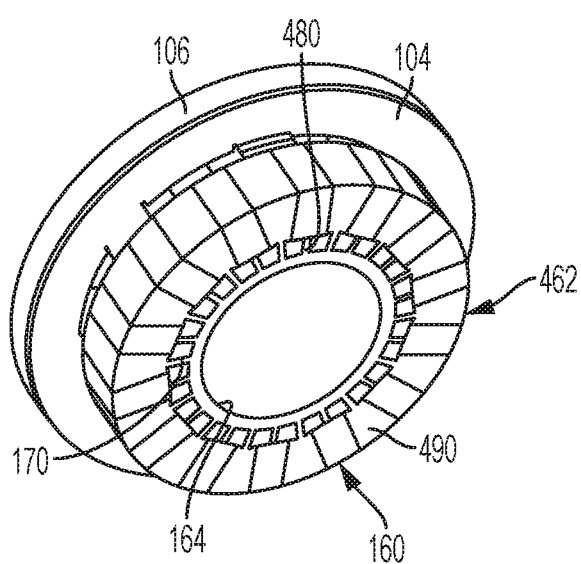
FIG. 14 is a perspective view of the magnetic support structure of the torque sensor according to another aspect of the invention.

Referring to FIG. 14, another embodiment of the magnetic support structure 462 is illustrated. The magnetic support structure 462 is similar to the embodiments described above such that similar reference numerals for similar components will be employed for ease of reference. The magnetic support structure 462 includes a solid wall 490 between the magnets to eliminate a space. This increases the flux that is captured from the entire metal region disposed between the magnets. The magnetic support structure 462 includes a plurality of magnet support bridges 480 which each correspond to a respective magnet 160. Each magnet support bridge 480 extends radially outwardly from the central hub 164 and is located circumferentially between the bridge members 170. The magnet support bridges 480 assist with accurate and easy placement of the magnets 160 in the cavities of the ferrous structure, as the magnet is pushed into place until it contacts and is supported by the magnet support bridges 480.

Figure 15:
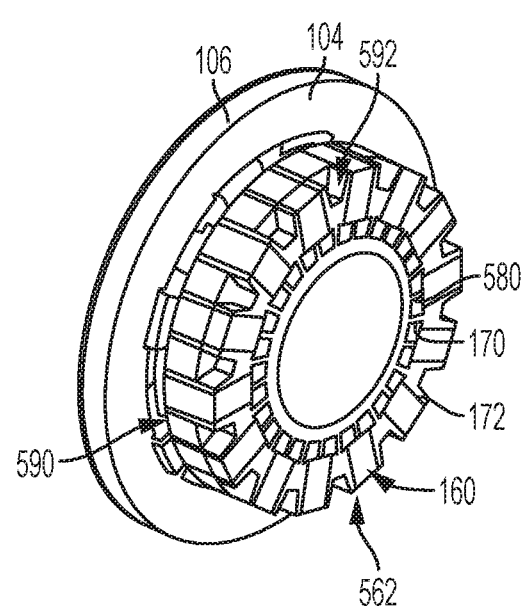
FIG. 15 is a perspective view of the magnetic support structure of the torque sensor according to another aspect of the invention.

Referring to FIG. 15, another embodiment of the magnetic support structure 562 is illustrated. The magnetic support structure 562 is similar to the embodiments described above such that similar reference numerals for similar components will be employed for ease of reference. The magnetic support structure 562 includes a partial wall 590 between the magnets to eliminate a full circumferential space at the outer portion of the magnet supports 172. Specifically, a space 592 is provided only at an axial portion of the magnet supports 172 that are distal from the inner lower rotor 104 and an outer lower rotor 106 (i.e., rings). The partial space 592 enhances the gain during torque detection. The magnetic support structure 562 includes a plurality of magnet support bridges 580 which each correspond to a respective magnet 160. Each magnet support bridge 580 extends radially outwardly from the central hub 164 and is located circumferentially between the bridge members 170. The magnet support bridges 580 assist with accurate and easy placement of the magnets 160 in the cavities of the ferrous structure, as the magnet is pushed into place until it contacts and is supported by the magnet support bridges 580.

Although the embodiments described herein provide the opportunity to use weaker (e.g., rare earth materials) magnets, it is to be appreciated that different materials may be employed for the plurality of magnets 160. For example, ferrite, neodymium or samarium magnets may be employed. These materials are merely illustrative and are not limiting of the numerous contemplated magnetic materials. The type of material may impact the extent to which the magnet support structure 162 covers the magnets. For example, for magnets that are prone to demagnetization (e.g., ferrite), the ferromagnetic material of the magnet support structure 162 substantially covers an entirety of the width of the magnets. Conversely, for magnets not prone to demagnetization (e.g., samarium), the ferromagnetic material is not placed entirely along the width of the magnets to increase the flux density near the steel rings of the lower rotor.

The embodiments described herein reduce cost of the torque sensor 100 by allowing for the use of cheaper magnets with less residual flux density, such as rare-earth free magnets.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A magnetic support structure of a torque sensor assembly comprising:
   a central hub; and
   a plurality of spoke segments extending radially outwardly from the central hub from a radially inner end of each of the spoke segments to a radially outer end of each of the spoke segments, each of the spoke segments comprising a pair of magnet supports defining a space therebetween, wherein a magnet for magnetic flux generation in an axial direction is positioned in a space between adjacent spoke segments and retained on one side by one magnet support of the pair of magnet supports on one of the plurality of spoke segments and on another side by one magnet support of another pair of magnet supports on an adjacent spoke segment, the space defined between the pair of magnet supports extending completely to the radially outer end of each of the spoke segments to form an opening at the radially outer end of each of the spoke segments.

2. The magnetic support structure of claim 1, wherein each of the plurality of spoke segments includes a bridge member extending between the central hub and the magnet support.

3. The magnetic support structure of claim 1, wherein the central hub is directly coupled to an upper shaft of a steering column assembly.

4. The magnetic support structure of claim 1, wherein the magnetic support structure is a single, integrally formed structure.

5. The magnetic support structure of claim 1, wherein the magnetic support structure is formed of a ferromagnetic material.

6. The magnetic support structure of claim 1, further comprising a plurality of magnet support bridges, each of the magnet support bridges extending radially outwardly from the central hub and circumferentially spaced from each other to radially support and position the magnets.

7. The magnetic support structure of claim 1, wherein the space defined by pair of magnet supports extends partially in an axial direction, a solid portion of the spoke segment located between the pair of magnet supports and extending partially in the axial direction.

8. The magnetic support structure of claim 1, further comprising at least one ledge extending circumferentially from each of the spoke segments to radially support and position the magnet.

9. The magnetic support structure of claim 1, wherein the magnet supported is magnetized in a circumferential direction of the magnetic support structure.

10. A torque sensor assembly comprising:
an upper rotor comprising:
a magnetic support structure including a central hub surrounding an upper shaft;
a plurality of spoke segments extending radially outwardly from the central hub, each of the spoke segments comprising a pair of magnet supports defining a space therebetween that extends completely to a radially outer end of each of the spoke segments to form an opening at the radially outer end of each of the spoke segments; and
a plurality of magnets, each of the magnets positioned in a space between adjacent spoke segments and retained on one side by one magnet support of the pair of magnet supports on one of the plurality of spoke segments and on another side by one magnet support of another pair of magnet supports on an adjacent spoke segment;
an outer lower rotor operatively coupled to a lower shaft and axially spaced from the upper rotor, the outer lower rotor including a plurality of U-shaped teeth disposed along a radially inner portion of the outer lower rotor;
an inner lower rotor operatively coupled to the lower shaft and located axially between the upper rotor and the outer lower rotor; and
at least one probe positioned between the outer lower rotor and the inner lower rotor, the at least one probe measures an axial flux generated by the upper rotor and directed by the outer lower rotor and the inner lower rotor.

11. The torque sensor assembly of claim 10, wherein each of the plurality of spoke segments includes a bridge member extending between the central hub and the magnet support.

12. The torque sensor assembly of claim 10, wherein the central hub is directly coupled to an upper shaft of a steering column assembly.

13. The torque sensor assembly of claim 10, wherein the magnetic support structure is a single, integrally formed structure.

14. The torque sensor assembly of claim 10, wherein the magnetic support structure is formed of a ferromagnetic material.

15. The torque sensor assembly of claim 10, wherein the plurality of magnets are magnetized in a circumferential direction of the magnetic support structure.

16. The torque sensor assembly of claim 10, further comprising a plurality of magnet support bridges, each of the magnet support bridges extending radially outwardly from the central hub and circumferentially spaced from each other to radially support and position the magnets.

17. The torque sensor assembly of claim 10, further comprising a plurality of ledges extending circumferentially from the spoke segments to radially support and position the plurality of magnets.

\* \* \* \* \*